(12) United States Patent
Flack (10) Patent No.: US 7,998,890 B2
(45) Date of Patent: Aug. 16, 2011

(54) NON-WOVEN COMPOSITE OFFICE PANEL

(75) Inventor: LeAnne O. Flack, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 13/006,771

(22) Filed: Jan. 14, 2011

(65) Prior Publication Data
US 2011/0108218 A1 May 12, 2011

Related U.S. Application Data

(63) Continuation of application No. 12/288,652, filed on Oct. 22, 2008, now Pat. No. 7,871,947.

(60) Provisional application No. 60/985,371, filed on Nov. 5, 2007.

(51) Int. Cl.
*D04H 1/54* (2006.01)
*D04H 3/14* (2006.01)
*D04H 5/06* (2006.01)

(52) U.S. Cl. ........ 442/411; 442/361; 442/364; 442/381; 442/394; 442/409; 442/414; 442/415; 428/920; 428/921

(58) Field of Classification Search .................. 442/361, 442/364, 381, 394, 409, 411, 414, 415; 428/920, 428/921
See application file for complete search history.

(56) References Cited

U.S. PATENT DOCUMENTS

| | | | | | |
|---|---|---|---|---|---|
| 3,073,735 | A | * | 1/1963 | Till et al. | 156/38 |
| 3,740,797 | A | * | 6/1973 | Farrington | 19/156.3 |
| 3,772,739 | A | * | 11/1973 | Lovgren | 19/156.3 |
| 3,837,995 | A | * | 9/1974 | Floden | 161/150 |
| 4,018,646 | A | * | 4/1977 | Ruffo et al. | 162/146 |
| 4,082,886 | A | * | 4/1978 | Butterworth et al. | 428/284 |
| 4,127,698 | A | * | 11/1978 | Shimizu et al. | 428/373 |
| 4,194,037 | A | * | 3/1980 | Stoller | 429/92 |
| 4,435,468 | A | * | 3/1984 | TenEyck | 428/285 |
| 4,863,797 | A | * | 9/1989 | Ichibori et al. | 428/359 |
| 4,931,357 | A | * | 6/1990 | Marshall et al. | 442/415 |
| 4,970,111 | A | * | 11/1990 | Smith, Jr. | 428/283 |
| 5,173,355 | A | * | 12/1992 | Vock et al. | 428/219 |
| 5,208,105 | A | * | 5/1993 | Ichibori et al. | 428/373 |
| 5,348,796 | A | * | 9/1994 | Ichibori et al. | 442/202 |
| 5,350,624 | A | * | 9/1994 | Georger et al. | 429/219 |

(Continued)

FOREIGN PATENT DOCUMENTS

EP 0 622 332 11/1994

(Continued)

*Primary Examiner* — Norca L Torres-Velazquez
(74) *Attorney, Agent, or Firm* — Cheryl J. Brickey (57) ABSTRACT

Provided herein is a non-stratified, or homogeneous, non-woven composite having (a) strength-imparting fibers of a relatively high denier and (b) binder fibers of a lower denier that adhere the composite together and that form a smooth, stiff skin on the outer surfaces of the composite. In one instance, the strength-imparting fibers are staple fibers and the binder fibers are bicomponent fibers having a low melt component. In a variation, the composite also contains a small percentage by weight (that is, less than 20%) of flame retardant fibers that impart flame resistant properties to the composite. Preferably, all of the fibers are comprised of the same polymeric material (e.g., polyester), so that the composite is recyclable. The resulting composite exhibits excellent flame retardance, strength, and stiffness, as well as having a smooth surface for attachment of a decorative fabric or other material. A process for manufacturing such composites is also provided.

20 Claims, 3 Drawing Sheets

U.S. PATENT DOCUMENTS

| | | | | |
|---|---|---|---|---|
| 5,399,423 | A * | 3/1995 | McCullough et al. | 428/287 |
| 5,407,739 | A * | 4/1995 | McCullough et al. | 428/287 |
| 5,458,960 | A * | 10/1995 | Nieminen et al. | 428/284 |
| 5,508,102 | A * | 4/1996 | Georger et al. | 428/297 |
| 5,698,298 | A * | 12/1997 | Jackson et al. | 428/198 |
| 5,723,209 | A * | 3/1998 | Borger et al. | 428/219 |
| 5,766,745 | A * | 6/1998 | Smith et al. | 428/218 |
| 5,856,243 | A * | 1/1999 | Geirhos et al. | 442/57 |
| 5,942,288 | A * | 8/1999 | Kajander | 427/389.7 |
| 6,346,491 | B1 * | 2/2002 | DeAngelis et al. | 442/110 |
| 6,517,676 | B1 * | 2/2003 | Mathur | 162/146 |
| 6,572,723 | B1 * | 6/2003 | Tilton et al. | 156/219 |
| 6,586,353 | B1 * | 7/2003 | Kiik et al. | 442/320 |
| 6,609,261 | B1 * | 8/2003 | Mortensen et al. | 5/698 |
| 6,718,583 | B1 * | 4/2004 | Diaz | 5/698 |
| 6,764,971 | B2 * | 7/2004 | Kelly et al. | 442/408 |
| 6,797,653 | B2 * | 9/2004 | Fay | 442/85 |
| 6,823,458 | B1 * | 11/2004 | Lee et al. | 726/16 |
| 2003/0100239 | A1 * | 5/2003 | Gaffney et al. | 442/354 |
| 2003/0106560 | A1 * | 6/2003 | Griesbach et al. | 128/849 |
| 2003/0200991 | A1 * | 10/2003 | Keck et al. | 134/6 |
| 2003/0224679 | A1 * | 12/2003 | Ahluwalia | 442/72 |
| 2003/0228460 | A1 * | 12/2003 | Ahluwalia | 428/315.5 |
| 2004/0028958 | A1 * | 2/2004 | Assink et al. | 428/920 |
| 2004/0060118 | A1 * | 4/2004 | Diaz | 5/698 |
| 2004/0060119 | A1 * | 4/2004 | Murphy et al. | 5/698 |
| 2004/0062912 | A1 * | 4/2004 | Mason et al. | 428/139 |
| 2004/0091705 | A1 * | 5/2004 | Hanyon et al. | 428/373 |
| 2004/0102112 | A1 * | 5/2004 | McGuire et al. | 442/59 |
| 2004/0106347 | A1 * | 6/2004 | McGuire et al. | 442/361 |
| 2004/0158928 | A1 * | 8/2004 | Gladney | 5/698 |
| 2004/0185731 | A1 * | 9/2004 | McGuire | 442/141 |
| 2004/0198125 | A1 * | 10/2004 | Mater et al. | 442/394 |
| 2004/0242107 | A1 * | 12/2004 | Collins | 442/403 |
| 2004/0242109 | A9 * | 12/2004 | Tilton et al. | 442/415 |
| 2004/0259451 | A1 * | 12/2004 | Paradis et al. | 442/381 |
| 2005/0023509 | A1 * | 2/2005 | Bascom et al. | 252/608 |
| 2005/0026528 | A1 * | 2/2005 | Forsten et al. | 442/414 |
| 2005/0176327 | A1 * | 8/2005 | Wenstrup et al. | 442/357 |
| 2006/0063458 | A1 * | 3/2006 | McGuire | 442/411 |
| 2006/0111003 | A1 * | 5/2006 | Balthes | 442/269 |
| 2006/0178064 | A1 * | 8/2006 | Balthes et al. | 442/327 |
| 2006/0252323 | A1 * | 11/2006 | Cline | 428/373 |
| 2006/0264142 | A1 * | 11/2006 | Wenstrup et al. | 442/415 |

FOREIGN PATENT DOCUMENTS

| | | |
|---|---|---|
| JP | 59 186750 | 10/1984 |
| JP | 7 40487 | 2/1995 |
| JP | 2002 287767 | 10/2002 |
| WO | WO 97/00989 | 1/1997 |
| WO | WO 01/31131 | 5/2001 |
| WO | WO 03/023108 | 3/2003 |
| WO | WO 2005/001187 | 1/2005 |

* cited by examiner

NON-WOVEN COMPOSITE OFFICE PANEL

RELATED APPLICATIONS

This application is a continuation of application Ser. No. 12/288,652 filed on Oct. 22, 2008, now U.S. Pat. No. 7,871,947, which claims priority to provisional application 60/985,371 filed Nov. 5, 2007, both of which are herein incorporated by reference in their entirety.

TECHNICAL FIELD

The present disclosure is related generally to the field of non-woven composites and specifically to substantially non-stratified (that is, homogeneous) composites made of a single polymeric material. Such composites include strength-imparting fibers of high denier to impart strength to the composite and binder fibers of a lower denier to adhere the composite together. The high "Z" fiber orientation creates a high loft product. Advantageously, such composites also include a small percentage (for example, less than 20% by weight) of an inherently flame retardant fiber, resulting in the formation of a composite that passes the ASTM E-84 burn test. The properties of strength, stiffness, and flame retardance make the present composites useful in a number of applications, including use in office panels, privacy screens, portable walls, automotive applications, ceiling tiles, and in other articles where such characteristics are beneficial.

BACKGROUND

The advent of cubicles for use in an office environment has generated a need for portable, lightweight, and versatile partitions. One response to this need was the creation of interlocking panel systems, in which a number of small modular panels are attached to a structural frame that forms the walls of the cubicle. Each individual modular panel is generally comprised of an individual metal frame or base around which, or over which, is stretched or secured a decorative fabric layer. In many instances, the decorative fabric layer is a flat woven fabric, chosen to complement the décor of the office setting, which is adhered to the surface of the modular panel.

Such office panels are subject to stringent performance requirements, including industry standards for flame retardance and practical standards for strength, stiffness, surface properties, and acoustical properties.

Flame retardance is perhaps the most important physical characteristic of these panels, because of safety considerations and industry requirements. To meet industry standards, office panels must meet Class A (or Class I) flammability requirements, including a Flame Spread Index score of 25 or less and a Smoke Developed Index score of 450 or less. The flame spread index is a number that relates to the rate of flame propagation or spread over time. The smoke developed index is a number that relates to the relative amount of smoke generated during the test for surface burning characteristics (i.e., flame spread). Both the Flame Spread Index and the Smoke Developed Index are calculated when samples are evaluated according to ASTM E84-04, entitled "Standard Test Method for Surface Burning Characteristics of Building Materials." In order to meet these requirements, most office panels include a fiberglass panel, which is added to enhance the flame retardance of the office panel. Fiberglass is well-known for its flame retardant properties, making it the current material of choice for these applications.

However, the manufacture and use of fiberglass panels raises several potential health and environmental issues. First, concerns exist about the health and wellness of persons exposed to fiberglass during manufacturing and installation of such panel systems. While manufacturers take measures (for example, providing ventilation and personal protective equipment) to ensure that workers are not exposed to inhalation risks or irritation from skin exposure during the manufacture and installation process, a better solution would involve the elimination of fiberglass from the modular panels.

A second problem associated with fiberglass is that it is generally not recycled. The recycling of fiberglass is very energy intensive and few products use recycled fiberglass content. Not only is the fiberglass itself generally not recycled, but panels containing fiberglass and other fiber or resin types are difficult to recycle due to their mixed content. Because manufacturers currently face increasing pressures to produce environmentally friendly products that may be reusable or recyclable at the end of the product's life, the industry is seeking a product that may be recycled but that exhibits the flame retardant performance of fiberglass.

Another issue to be addressed by any product introduced into this market is the need for the composite panel to be both strong and stiff, so that when the composite is oriented vertically into a frame, it does not bend or warp. The term "strength" refers to the composite's ability to resist permanent deformation (e.g., bending or bowing) that falls short of a complete structural failure. The term "stiff" refers to the composite's ability to resist non-permanent deformation (e.g., bending or bowing) under a load. When used in office panels, the present composites are positioned in a vertical orientation and must maintain their physical integrity, resisting breakage, buckling, bending, curling, warping, sagging, etc. Such properties may be similarly important for applications, other than the modular panels described herein.

Yet another desirable property for composites used in office panels is for the composite to have a smooth exterior surface on at least one side. Because a textile fabric is attached (e.g., bonded or glued) to the surface of the composite panel, it is necessary that such surface be stiff, smooth, and free from protrusions, bumps, or bulges that would detract from the appearance of the decorative textile fabric. A related desirable property in most cases is that the composite surface be lightly colored, white, or non-colored, such that the composite's surface does not show through any lightly colored textile applied thereto and interfere with the aesthetics of the completed panel.

Finally, another desirable characteristic for office panels (and other applications) is that the composite exhibit sound-absorbing acoustical properties. In an office environment, it is desirable that office sounds not be reflected to minimize distractions to employees. As mentioned previously, many office panels contain only a flat woven fabric attached to a metal sheet, resulting in the reflection and repropagation of sound waves, as the sound waves may cause the metal frame or sheet to vibrate and re-transmit the sound. To combat these problems, in some instances, manufacturers use sound absorptive septa between office panels and, in other instances, use sound-absorptive composites as the support for the decorative textile covering.

Thus, there are many substantive issues to be addressed in manufacturing a composite material for use in the office panel industry. The composites described herein address these issues and provide a superior alternative to the existing fiberglass products currently available in the market.

SUMMARY

Provided herein is a non-stratified, or homogeneous, non-woven composite having strength-imparting fibers of a high denier and binder fibers of a lower denier that adhere the composite together and that form a smooth, stiff skin on the outer surfaces of the composite. In one embodiment, the strength-imparting fibers are staple fibers and the binder fibers are bicomponent fibers having a low melt component. In another embodiment, the composite also contains a small percentage by weight (that is, less than 20%) of flame retardant fibers that impart flame resistant properties to the composite. Preferably, all of the fibers are comprised of the same polymeric material (e.g., polyester), so that the composite is more easily recyclable. The resulting composite exhibits excellent flame retardance, strength, and stiffness, as well as having a smooth surface suitable for attachment of a textile fabric or other material. A process for manufacturing such composites is also provided.

DETAILED DESCRIPTION

The present composites include strength-imparting fibers, binder fibers, and, in some variations, flame retardant fibers. When making a recyclable product, the fibers are comprised of the same material, which is, preferably, a thermoplastic material. "Thermoplastic" fibers are those that are permanently fusible and that may melt at higher temperatures. Examples of thermoplastic fibers used herein are various polyesters (such as polyethylene terephthalate, polypropylene terephthalate, and polybutylene terephthalate), polyolefins (such as polyethylene and polypropylene), polyamides (such as nylon 6, nylon 6,6, nylon 4,6, and nylon 12), polyphenylenesulfide, and the like.

Strength-Imparting Fibers

To impart strength to the composite, fibers having a relatively large denier are used. For example, the fibers may have a denier that is at least two or three times that of the binder fibers. As a particular example, the strength-imparting fiber may have a denier of about 15 or higher, while the binder fiber may have a denier of about 4. Other fiber sizes and ratios may be used as necessary, depending on the properties needed for a given end use. Preferably, the strength-imparting fiber has a denier of at least about 30. In another preferred embodiment, the strength-imparting fiber has a denier of about 45.

To obtain the requisite strength needed for use in office panels and in many other applications, at least 20% by weight of the composite is comprised of strength-imparting fibers. In instances where flame retardance is less significant, the amount of strength-imparting fibers may be greater, perhaps as much as about 50% by weight. In instances where a separate flame retardant fiber is also included, the strength-imparting fibers are present in an amount of up to about 40% by weight. In some cases, the strength-imparting fibers are present in an amount between about 25% by weight and about 35% by weight of the composite.

It is possible that the strength-imparting fibers may be dyed or otherwise colored (such as in the case of solution dyed yarns) before being incorporated into a composite. However, in many instances, such as those in which the composite is to be subsequently covered by a textile layer, it may be desirable to use non-colored (that is, white) fibers to prevent the composite from showing through the textile fabric.

Optionally, the strength-imparting fibers may be made of recycled, post-consumer materials, thereby reducing the environmental impact of the manufacture of the composite.

Binder Fibers

To adhere the composite fibers together and to produce a smooth, stiff skin on the outer surfaces of the composite, binder fibers containing at least one low-melting point component are used. In general, such binder fibers are significantly smaller than the strength-imparting fibers and may be homogeneous or bicomponent. The binder fibers may have a denier of at least about 4 and, in other instances, of at least about 15.

Preferably, the binder fibers are bicomponent fibers having a core-sheath configuration, where the sheath is a low-melt thermoplastic material (for example, a low-melt polyester). Other configurations of fibers may be used instead, including island-in-the-sea, side-by-side, and segmented pie configurations, any of which may contain a low-melt component. Preferably, the low-melt component comprises at least 20% of the weight of the composite.

When the binder fibers are bicomponent fibers, the binder fibers are preferably present in an amount comprising between about 50% and about 70% of the weight of the composite. As will be described herein, the low-melt component of the binder fibers functions to hold the fibers together within the composite and also to form a stiff surface on the outer layers of the composite, which helps to prevent bending. For example, in one polyester core-sheath fiber with a polyester core and a low-melt polyester sheath, the sheath is approximately 35% of the weight of the fiber and exhibits a melting point of about 130° C. Alternately, the percentage of the fiber that is a low-melt polymer may be increased, if desired, and/or the melting temperature of the low-melt polymer may be decreased.

The component of the binder fibers that does not melt during processing (for example, the core in a core/sheath fiber) contributes to the strength of the composite. For this reason, the binder fibers are desirably as large as possible, as mentioned above. Although a 45-denier bicomponent fiber is not commercially available at this time, it is contemplated that such a fiber could successfully be used as the majority, if not all, of the composite (perhaps with a small percent of flame retardant fibers) to create an exceptionally strong product. Because such fibers are not presently available, the weight percentages used reflect the incorporation of a strength-imparting fiber, as described above.

Alternately, the binder fibers may be low-melt fibers, again preferably of as large as a denier as is commercially available and of the same polymeric material as the strength-imparting fibers.

As with the strength-imparting fibers, the binder fibers may be dyed or otherwise colored (such as in the case of solution dyed yarns) before being incorporated into a composite. In the case of core-sheath fibers, the core, the sheath, or both may be colored.

Flame Retardant Fibers

As used herein, the term "flame retardant fibers" means fibers having a Limiting Oxygen Index (LOI) value of 20.95 or greater, as determined by ISO Standard 4589-1.

In applications where flame retardance is important or essential, such as in the case of office panels, the incorporation of flame retardant fibers is advisable. Unexpectedly, it has been found that flame retardant fibers may be used in amounts as low as 5% by weight of the composite and as high as 20% by weight of the composite, where the low end of the range provides surprisingly robust flame retardant properties, while allowing a relatively high percentage of strength-imparting fibers, and the high end of the range does not adversely affect the strength of the composite, while maximizing flame retardance. In some cases, the flame retardant fibers may be used in amounts from about 10% to about 15% of the weight of the composite.

Preferably, the flame retardant fibers are polymeric fibers where a non-halogenated flame retardant additive (for example, a phosphorous atom) has been incorporated into the molecular backbone of the polymer. One such example is a flame retardant polyester fiber sold by Trevira GmbH under the tradename "TREVIRA® CS". The TREVIRA® CS flame retardant fibers are available in two "loadings" of flame retardant additives, a heavy loading (6,000 parts per million) and a light loading (3,000 parts per million). Preferred percentages provided above are based on flame retardant fibers with a heavy loading. Alternately, conventional polyester fibers may be topically treated with flame retardant agents before such fibers are incorporated into a composite.

A small range of TREVIRA® CS fiber sizes is currently available, and, as with the binder fibers, larger deniers are preferable to maintain the strength of the composite. Generally, the flame retardant fibers are at least about 5.6 denier (6 decitex) and, in some instances, are at least about 11.1 denier (10 decitex) and, in other instances, are about 14.4 denier (13 decitex). In those instances where the flame retardant fibers are about 13 decitex, their size approximates that of the largest currently available binder fibers (those having a denier of about 15), which facilitates the creation of a homogeneous web of fibers.

Where the flame retardant properties are achieved by topical treatment of the fibers before composite construction, a wider array of fiber deniers may be used. For example, it is conceivable that relatively large fibers (for example, having deniers of the size of the strength-imparting fibers), which have been topically treated to provide flame retardancy, may be successfully used in this application, perhaps acting as the strength-imparting fibers and eliminating the need for any separate strength-imparting fibers.

Process of Manufacturing

Figures 1A, 1B:
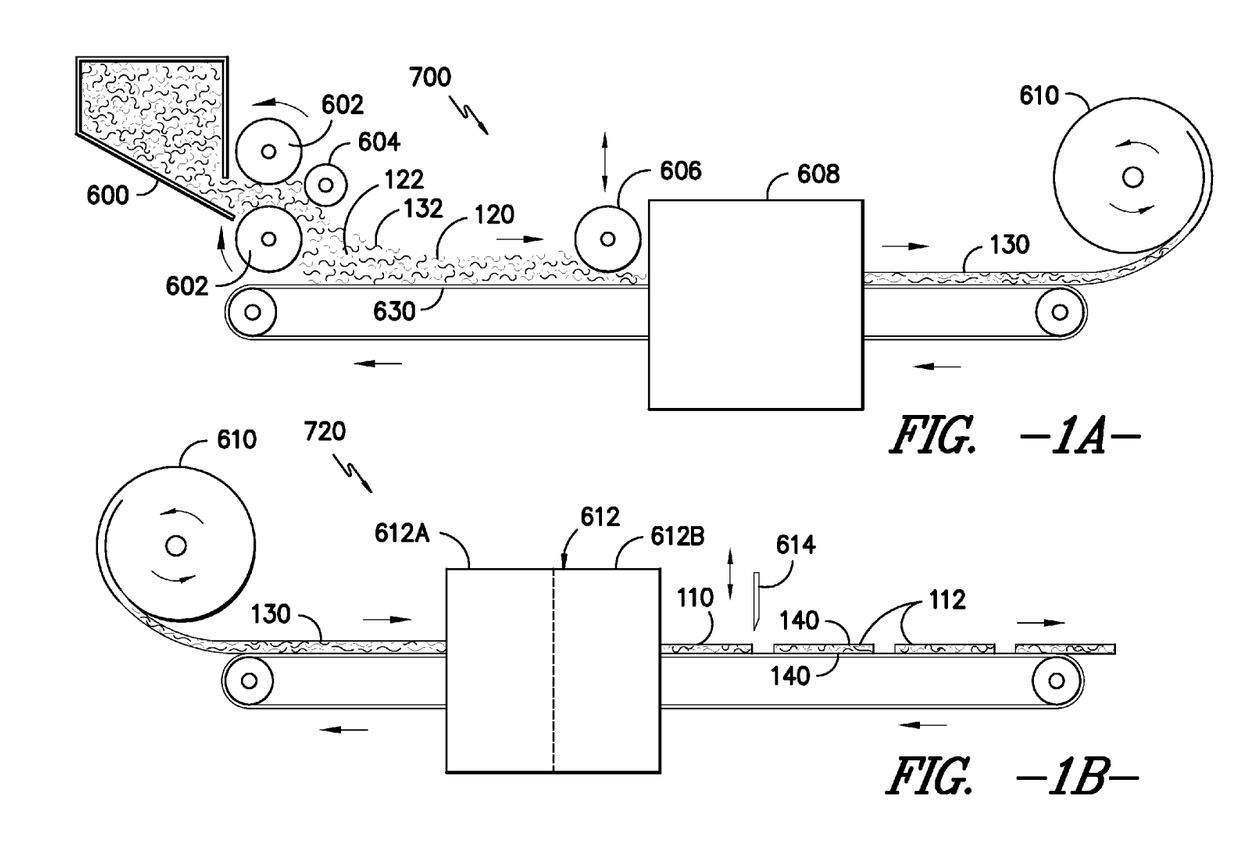
FIG. 1A is a schematic representation of a process for producing a loosely consolidated non-woven web of fibers.
FIG. 1B is a schematic representation of a process for producing a composite from the loosely consolidated non-woven web shown in FIG. 1A.
Figure 2:
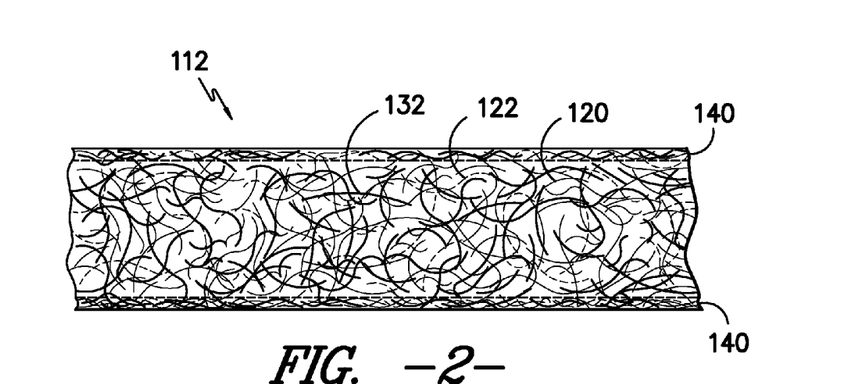
FIG. 2 is a cross-sectional view of the composite shown in FIG. 1B.

Turning now to the accompanying Figures, FIGS. 1A and 1B are schematic diagrams that illustrate the process for forming a non-woven material 110 or non-woven composite 112 (such composite being shown in FIG. 2). This process is accomplished using air lay equipment 700, such as is commercially available from Fehrer AG of Linz, Austria, under the tradename "K-12 HIGH-LOFT RANDOM CARD." In preparation for processing, strength-imparting fibers, binder fibers, and flame retardant fibers are weighed, opened, mixed, and carded. Then, as illustrated in FIG. 1A, binder fibers 120, flame retardant fibers 122, and strength-imparting fibers 132 are fed from a hopper 600 through a pair of rotating guide rolls 602 toward a deflecting roll 604. The deflecting roll 604 is positioned such that it creates turbulence in the space between deflecting roll 604 and guide rolls 602, which serves to blend the fibers 120, 122, and 132 into a homogeneous mixture.

The fibers 120, 122, and 132 are then projected onto a collection belt 630. If the deflection roll 604 were not present, then the strength-imparting fibers 132 would be projected further along the collection belt 630 due to their larger denier. However, the presence of the deflection roll 604 causes the fibers 120, 122, 132 to be blended, so that such fibers are projected in relatively equal distribution onto the collection belt 630. A deflection bar may be used in place of the deflection roll 604. Whether a deflection bar or a deflection roll is used, the deflection means is stationary (that is, held in a fixed position on the machine during operation), but adjustable (that is, able to be repositioned on the machine as necessary).

A certain percentage of the projected fibers 120, 122, and 132 tends to be oriented in the "z" direction (that is, somewhat vertical with respect to the collection belt 630), thereby imparting a high loft to the fibrous web. This z direction is much more pronounced in the product when using the deflection roll as compared to when the roll is not used. This high z orientation allows the product to have higher compression strength and more loft. The z orientation can be altered by changing the position of the mixing bar. In one embodiment, the deflection bar is positioned closer to the drum which ejects the fibers resulting in more z direction orientation. When the deflection bar is positioned further from the drum, less z direction orientation results. If the deflection bar is positioned completely out, the fibers would stratify and would be substantially unmixed.

The lofted fibrous web is then conveyed under an adjustable gap-setting roll 606 that begins compressing the fibers 120, 122, and 132 into a non-woven web. The non-woven web is conveyed though an oven 608, where the temperature is set to soften the binder fibers 120 so that at least some of the sheaths of the binder fibers 120 at least partially melt and secure the fibrous components together into a loosely consolidated web 130. This same oven has a cooling zone where the product is then cooled to stabilize the non-woven web until the process of forming the consolidated composite can be completed if desired. Some office panels are constructed with a lofted substrate. This product can be cut into the appropriate sizes and used in this form or the loosely consolidated web 130 may be taken up on a take-up roll 610 or another storage device to be cut to size by a converter or final customer.

As shown in FIG. 1B, the loosely consolidated web 130 is then conveyed through an apparatus 612, preferably having a heated zone 612A and a cooling zone 612B. Such processing may effectively occur in a double-belt press, a laminator, a press with hot and cold zones, or other similar equipment. In heated zone 612A, the loosely consolidated web 130 is compressed to a desired thickness by adjustable gap rollers (not shown) and is heated to a temperature sufficient to melt the low-melt component of the binder fibers 120. Thus, the sheaths of the binder fibers 120 melt and flow through the web 130, adhering the web together and forming a film-like skin 140 on both outer surfaces of the consolidated non-woven 110. The skin 140 is primarily made of the low-melt sheaths of the binder fibers 120. The flame retardant fibers 122 and the strength-imparting fibers 132 may also be present, but perhaps to a lesser degree. While reference has been made to core-sheath type binder fibers, it is to be understood that other types of binder fibers may instead be used, as may fibers of a single, low-melt polymer.

In cooling zone 612B, the consolidated non-woven 110 is cooled by conduction, using chilled water to cool the platens. By conveying the consolidated non-woven 110 through the cooling zone 612B, the melted binder fibers 120 are solidified and the final height of the non-woven 110 is set to the desired height.

Once the consolidated non-woven 110 emerges from the cooling zone 612B of apparatus 612, it is conveyed through a cutting apparatus 614, such as a guillotine-type cutter. Other cutting apparatus may instead be used, as appropriate or desired. The consolidated non-woven 110 is cut into panels 112 of non-woven composite of the desired dimensions. The formation and consolidation processes (FIGS. 1A and 1B) may be combined such that there is no rollup of the loosely consolidated web. Instead the line is designed that the heaters only heat the fibrous non-woven and eliminate the cooling process. The heated non-woven will then enter the compression oven where the web is heated and then cooled as described above. The combination of the two processed allow the product to be run as much as 50% faster than having two separate processes.

Non-woven composite panel 112 is illustrated in cross-section in FIG. 2. As shown, the outside surfaces have a smooth, film-like skin 140, which is formed primarily of the low-melt binder fibers 120. Also shown are the strength-imparting fibers 132 and the flame retardant fibers 122, positioned generally uniformly between skins 140. As described above, the strength-imparting fibers 132 are considerably larger denier than the binder fibers 120 and the flame retardant fibers 122. The binder fibers 120, however, comprise the majority of the fiber content. Where core-sheath binder fibers are used, the sheath portion of the binder fibers at least partially melts, leaving the core component within the composite. These core components also contribute to the strength of the overall composite.

Skins 140 impart important properties to the composite 112. First, the skins 140 are smooth surfaces to which a (decorative) textile layer (not shown) may be attached. Because the skin 140 has no surface irregularities (such as roughness, protrusions, and the like), it is smooth in appearance, thereby ensuring that a good bond may be formed between the composite 112 and the textile layer. Also, the absence of any such surface irregularities ensures that the textile layer applied to the composite will appear smooth and aesthetically pleasing.

The skins 140 impart stiffness to the composite 112. By having both skins 140 be made of the same fibers, each side is equally stiff, that is, equally capable of resisting bending. Stratified composites typically have a first skin made of a first fiber size and a second skin made of a second fiber size, resulting in an uneven ability of the composite as a whole to resist bending. As a result of the differentiated fiber layers, stratified composites are particularly susceptible to bending at the side of the composite where the lower denier fibers are located. This tendency is especially noticeable when the stratified composites have a thickness greater than about 3 to 4 millimeters. The present homogeneous composite 112 is equally resistant to bending from both sides, a feature which is important in applications where the composite is vertically oriented, such as in an office panel.

Finally, the skins 140 are abrasion resistant and result in reduced air permeability as compared to the intermediate loosely consolidated web. Noticeably, there are voids between the fibers 120, 122, and 132 within composite 112. These voids help to improve the acoustical (that is, sound dampening) properties of the composite. The homogenous composite was tested for Sound Absorption by the Reverberation Room Method ASTM C 423-07/NVLAP08/P03 in an office system at Riverbanks Acoustical Labs in Illinois. The system consisted of a steel frame that offers rigidity and four skins (2 per side). The skins consist each of a substeel frame that offers rigidity, the polyester composite, and textile covering. The entire skin attaches to the steel frame. The polyester composite was approximately 0.154" in thickness. The office system tested had a NRC (Noise Reduction Coefficient) rating of 0.55. This same system was tested for Sound Transmission Loss of Building Partitions ASTM E 90-04/NVLAP 08/P06. The STC (Sound Transmission Coefficient) is 5. A rating of 5 is considered very low and would not meet many of the industry standards for transmission loss. A version was tested where a polyester film with a thickness of 200 gauge was applied to the back of the homogenous composite in-line during the compression phase. The STC improved from a 5 to 17 which is more in-line with the industry requirements. When this same version with film was tested for absorption (Sound Absorption by the Reverberation Room Method ASTM C 423-07/NVLAP08/P03) in the same system as described above, the NRC was 0.25. Typical industry requirements are 0.5-0.66 on NRC and anywhere from 8-20 on STC. Creating a product that meets both requirements is challenging because improving NRC generally decreases STC and vice versa.

The addition of the 4d bicomponent fiber in combination with the 15 denier bicomponent to the blend helps improve the acoustic absorption of the product. The lower denier fibers help fill up more of the voids as the fibers are smaller in size. Maximizing the absorption of the product and the strength and stiffness of the product is somewhat counter intuitive. The strength imparting fibers are larger in size and have less absorptive properties and the lower denier fibers while good for absorption are much less strong and stiff.

In order to improve the NRC with the film version, perforation of the film is an option. The film can be perforated in-line after the compression oven with a pin roller or the film could be purchased already perforated. It is preferred to use a film made of polyester so that the entire product is polyester based and can be easily recycled. The holes in the film need to be placed at a minimum of 1 hole per inch. Changing the number of holes per inch can result in different NRC and STC ratings as will be shown in examples below.

Another interesting aspect of the skins 140 is that the skins 140 may be printed, using thermal transfer printing, screen printing, rotary printing, digital printing, or the like, which may eliminate the need for the application of a decorative textile to the skin 140 in some applications. Alternately, some or all of the fibers used in composite 112 may be dyed prior to incorporation in the composite, using one or more colors. As yet another alternative, the composite 112 may be embossed with a decorative pattern. Optionally, a film (perhaps printed) or a scrim may be applied to the composite in lieu of, or in addition to, the textile layer. The high amount of bicomponent fibers in the product enable the scrim and/or film to be applied to the product without any adhesive. These layers can be applied to the homogeneous composite in-line during the compression process. Thus, there are many options for improving the aesthetic properties of the composite. Adding a colored scrim layer may give the market a more aesthetic product that would be more cost competitive over tradition textile coverings. The film preferably made of PET serves to improves strength and stiffness of the product by 40% and provide an acoustic barrier which improves the sound transmission of the panel from an STC of 5 to an STC of 16.

Figure 3:
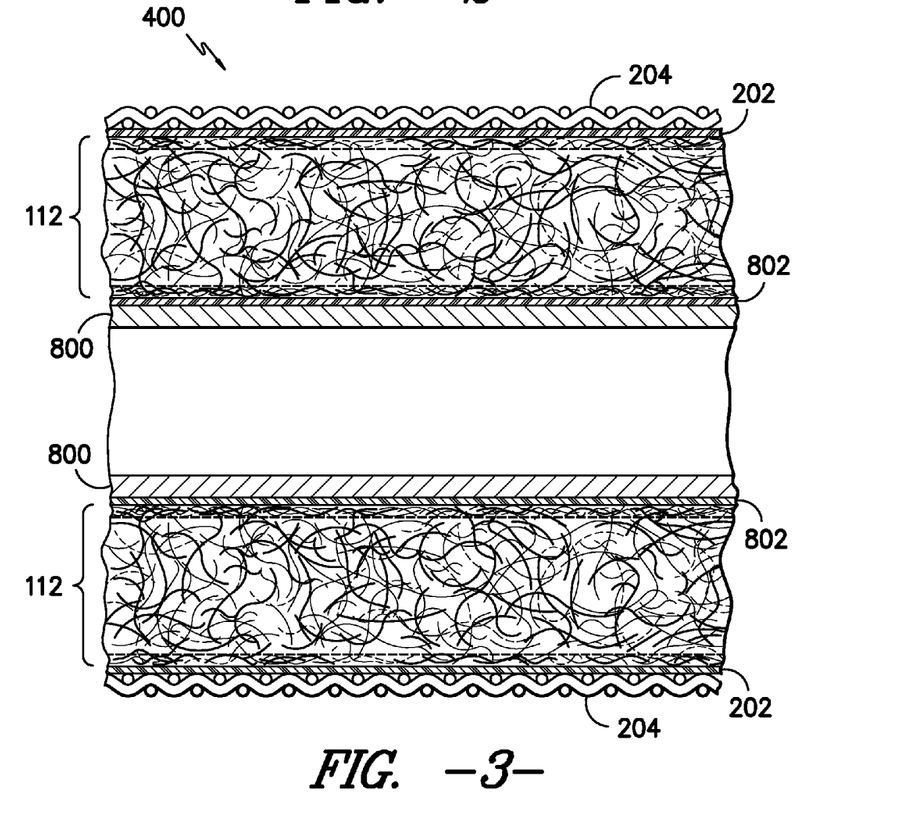
FIG. 3 is a cross-sectional view of two office panels containing the composite of FIG. 1B, as such panels may be installed in an office panel system.

FIG. 3 represents an exemplary configuration of the use of composite 112 in an office panel system. As shown, the office panel system includes two mounting surfaces 800, which are separated from one another to create an air gap there between. To the exterior sides of each frame is applied a layer of adhesive 802 for securing a composite 112. Mounting surfaces 800 may be in the form of frame-forming flanges or in the form of solid, sheet-like surfaces (as shown), in either case forming, or being attached to, a rigid frame defining the perimeter of office panel. To secure a composite 112 to the mounting surface 800, a layer of adhesive 802 may be applied to the mounting surface 800, to the back of the composite 112, or both.

Alternately, the mounting surface 800 may be designed such that the composite 112 is secured therein without the need for adhesive (for example, composite 112 may be mounted into the mounting surface 800 with clips, brackets, or other fasteners). A layer of adhesive 202 is applied to the outwardly facing side of composite 112 to secure a decorative textile 204 thereto, if desired. The decorative textile 204 may be any desired textile substrate, including a woven fabric, a knit fabric, a non-woven fabric, or any other suitable textile construction.

The composite 112 may be pre-assembled with an adhesive layer 202 thereon with the adhesive layer being a web (film-type) adhesive or a powdered, heat- or pressure-activated adhesive, if so desired. It has been found that the application of an adhesive layer (e.g., a film-type adhesive) significantly increases the strength of the composite, as will be shown in the Examples below.

As a variation of the office panel system in FIG. 3, the present composite 112 may be heated and molded to the preferred configuration, such that an office panel may be created wherein the need for separate mounting elements or separate frame elements is reduced or eliminated. In molding the composite material, it is contemplated that a composite material having a uniform thickness may be molded into a final product having non-uniform thicknesses (that is, the molded product may have one or more areas of greater or lesser thickness) or that a loosely consolidated non-woven web may be molded during the consolidation process into a final product having non-uniform thicknesses. The fact that the composite material is comprised of a thermoplastic material causes the composite to be moldable, an advantage not achievable with conventional thermoset fiberglass composites.

EXAMPLES

Comparison Examples of stratified tiles (identified as Stratified 1-Stratified 5 and abbreviated as S1-S5) were prepared, using components shown in Table 1A, and evaluated for strength and stiffness, as reported in Table 1B. For Examples S1-S5 all of the staple fibers were polyester, and the bicomponent fibers were polyester core-sheath fibers having a low-melt sheath. The stratified Examples S1-S5 were prepared using the same equipment as described previously, except that the deflector roll was removed, thereby allowing the higher denier fibers to be projected a greater distance from the guide rolls. Each of Examples S1-S5 weighed between about 900 and 1000 g/m² and had a thickness of between about 9 and 10 mm. Example S5 included TREVIRA® CS flame retardant polyester fiber (13 decitex), which had a phosphorous loading of 6,000 parts per million (ppm).

TABLE 1A

Components of Stratified Examples S1-S5

| | Binder Fiber | | Staple Fiber | | |
|---|---|---|---|---|---|
| Ex. | denier; type | % by wt. | denier | % by wt. | Comments |
| S1 | 2 d bico | 30% | 45 d | 30% | too open |
| | 15 d bico | 40% | | | 1 surface was not smooth |
| S2 | 2 d bico | 30% | 60 d | 30% | too open |
| | 15 d bico | 40% | | | 1 surface was not smooth |
| S3 | 2 d bico | 30% | 15 d | 30% | 2 smooth surfaces |
| | 15 d bico | 20% | | | good acoustics |
| | 45 d low-melt | 20% | | | |
| S4 | 2 d bico | 15% | 2 d | 10% | not strong or stiff |
| | 15 d bico | 50% | 15 d | 25% | enough |
| S5 | 15 d bico | 45% | 15 d FR | 10% | poor stratification |
| | 45 d low-melt | 5% | 45 d | 30% | between 45 d and |
| | 60 d low-melt | 10% | | | 60 d |

Stratified Examples S1-S5 were evaluated for strength and stiffness, according to ASTM D790-03, entitled "Standard Test Methods for Flexural Properties of Unreinforced and Reinforced Plastics and Electrical Insulating Materials." The measurements for strength and stiffness were made in the cross-machine direction. The results are found in Table 1B below.

TABLE 1B

Evaluation of Stratified Examples S1-S5 (Cross-Machine Direction)

| Examples | Weight | Thickness | Strength | Stiffness |
|---|---|---|---|---|
| S1 | 900 g/m² | 10.8 mm | 13.9 N | 1.5 N/mm |
| S2 | 995 g/m² | 9.2 mm | 15.4 N | 1.3 N/mm |
| S3 | 951 g/m² | 9.4 mm | 7.4 N | 1.9 N/mm |
| S4 | 941 g/m² | 9.4 mm | 9.9 N | 2.3 N/mm |
| S5 | 957 g/m² | 9.2 mm | 16.8 N | 2.4 N/mm |

Two fiberglass products (identified as F1 and F2) were obtained and evaluated, using the procedures outlined in ASTM D790-03. The results of this evaluation are provided below in Table 1C for reference. The fiberglass samples used were commercially available products made of approximately 90% glass fiber and about 10% urea formaldehyde as the binder.

TABLE 1C

Evaluation of Fiberglass Examples F1 & F2 (Cross-Machine Direction)

| Examples | Weight | Thickness | Strength | Stiffness |
|---|---|---|---|---|
| Fiberglass 1 | 994 g/m² | 9.6 mm | 10 N | 3.7 N/mm |
| Fiberglass 2 | 1180 g/m² | 10.0 mm | 12.9 N | 4.2 N/mm |

As seen by comparing Table 1B with Table 1C (particularly with Example F1), none of the stratified examples simultaneously possesses the strength and stiffness desired for the target applications (that is, strength and stiffness which approximates, or surpasses, those of commercial fiberglass products of a similar weight).

Examples (identified as Homogeneous 1-7 and abbreviated H1-H7) used the equipment was that described previously to create a non-stratified tile. For Examples H1 and H2, the equipment was fitted with a high-loft attachment. For Examples H3-H7, the equipment was fitted with a deflection bar.

The non-stratified Examples H1-H7 had a weight of between about 950 and 1300 g/m² and a thickness of between about 8.9 and about 11.1 mm. As above, all of the staple fibers were polyester, and the bicomponent fibers were polyester core-sheath fibers with a low-melt sheath. The flame retardant fiber used in Examples H6 and H7 was the TREVIRA® CS flame retardant polyester fiber having a phosphorous loading of 6,000 parts per million (ppm).

TABLE 2A

Components of Homogeneous Examples H1-H7

| Ex. | Binder Fiber denier; type | Binder Fiber % by wt. | Staple Fiber denier | Staple Fiber % by wt. | Flame Retardant (TREVIRA ® CS) Fiber denier | Flame Retardant (TREVIRA ® CS) Fiber % by wt. |
|---|---|---|---|---|---|---|
| H1 | 15 d bico | 70% | 45 d | 30% | — | — |
| H2 | 15 d bico | 70% | 45 d | 30% | — | — |
| H3 | 15 d bico | 70% | 15 d | 30% | — | — |
| H4 | 15 d bico | 70% | 45 d | 30% | — | — |
| H5 | 15 d bico | 70% | 45 d | 30% | — | — |
| H6 | 15 d bico | 63% | 45 d | 27% | 13 dtex | 10% |
| H7 | 15 d bico | 59% | 45 d | 26% | 13 dtex | 15% |

Homogeneous Examples H1-H7 were also evaluated for strength and stiffness, according to ASTM D790-03, entitled "Standard Test Methods for Flexural Properties of Unreinforced and Reinforced Plastics and Electrical Insulating Materials." The measurements for strength and stiffness were made in the cross-machine direction. The results are found in Table 2B below.

TABLE 2B

Evaluation of Homogeneous Examples H1-H7 (Cross-Machine Direction)

| Examples | Weight | Thickness | Strength | Stiffness |
|---|---|---|---|---|
| H1 | 1079 g/m² | 9.1 mm | 26.5 N | 5.1 N/mm |
| H2 | 967 g/m² | 9.6 mm | 15.2 N | 3.1 N/mm |
| H3 | 1020 g/m² | 11.1 mm | 6.9 N | 1.9 N/mm |
| H4 | 1055 g/m² | 10.3 mm | 14.0 N | 4.2 N/mm |
| H5 | 1154 g/m² | 8.9 mm | 27.1 N | 5.6 N/mm |
| H6 | 1025 g/m² | 8.6 mm | 18.9 N | 4.4 N/mm |
| H7 | 1245 g/m² | 10.5 mm | 25.7 N | 4.5 N/mm |

Examples H1, H2, H4, and H6 are approximately equal in weight and thickness with Example F1. At these weights and thicknesses, the homogeneous composites (H1, H2, H4, and H6) performed better than the fiberglass in terms of strength and comparably to, or better than, the fiberglass in terms of stiffness. This performance is attributable to the presence of the strength-imparting (45-denier) fibers and to the non-stratified construction of the composites.

Example H3, which contained only 15-denier fibers, exhibited significantly lower values for strength, as compared with the 45-denier-containing composites. Examples H5 and H7, which have weights that are more comparable to Example F2, performed considerably better in terms of strength and stiffness than Example F2. Homogeneous Examples H6 and H7 were also evaluated for flame retardance, as will be discussed later herein.

The effect of fiber selection to facilitate homogeneous blending and the effect of homogeneous blending of the fibers (as compared to stratification) are evident by comparing samples of approximately equal weight and thickness. Stratified Example S3 and Homogeneous Example H2 were evaluated and compared to fiberglass, as shown below in Table 3. As before, all measurements were made in the cross-machine direction.

TABLE 3

Effect of Fiber Selection and Blending on Physical Properties (Cross-Machine Direction)

| Examples | Weight | Thickness | Strength | Stiffness |
|---|---|---|---|---|
| S3 | 979 g/m² | 9.7 mm | 6.2 N | 1.8 N/mm |
| H2 | 967 g/m² | 9.6 mm | 15.2 N | 3.1 N/mm |
| F1 | 994 g/m² | 9.6 mm | 10 N | 3.7 N/mm |

From Table 3, it is seen that the homogeneous Example H2 performs significantly better than either the fiberglass product or the stratified Example S3 in terms of strength. In terms of stiffness, the homogeneous product performs comparably with fiberglass and significantly better than the stratified product.

The effect of product weight on physical properties of the non-stratified Examples is noticeable by comparing Examples H1 and H2. Such results are shown below in Table 4.

TABLE 4

Evaluation of Effect of Product Weight on Physical Properties (Cross-Machine Direction)

| Examples | Weight | Thickness | Strength | Stiffness |
|---|---|---|---|---|
| H1 | 1079 g/m² | 9.1 mm | 26.5 N | 5.1 N/mm |
| H2 | 967 g/m² | 9.6 mm | 15.2 N | 3.1 N/mm |

As seen by comparing the H1 and H2 test results, an increase in weight of approximately 10% resulted in an increase in strength of more than 40% and an increase in stiffness of at least 40%. Such results were achieved with no other modification to the process or the composite. Moreover, as described above, the H2 homogeneous sample performed comparably to fiberglass for stiffness, and both the H1 and H2 homogeneous samples performed better than fiberglass for strength. Additionally, it was found that the H1 sample exhibited considerably higher strength and stiffness over the fiberglass sample with only an approximately 10% increase in weight.

Yet another set of evaluations was conducted to determine the effects achievable by applying an adhesive layer to homogeneous Examples H3 and H4. A polyester adhesive was applied, via powder coating at an add-on level of about 10-20% by weight of the composite, to one side of the composites manufactured as described above. The adhesive powder was a commercially available polyester adhesive sold by Seydel-Woolley of Pendergrass, Ga. The adhesive-coated Examples were then evaluated using the test method provided previously (with measurements being made in the cross-machine direction), and the results are shown in Table 5 below. The two fiberglass samples of different weights (F1 and F2) were used for comparison.

TABLE 5

Evaluation of Effect of Adhesive Application on Physical Properties - (Cross-Machine Direction)

| Examples | Weight | Thickness | Strength | Stiffness |
|---|---|---|---|---|
| Fiberglass 1 | 994 g/m² | 9.6 mm | 10 N | 3.7 N/mm |
| H3 w/adh. | 1050 g/m² | 9.6 mm | 12.2 N | 3.2 N/mm |

TABLE 5-continued

Evaluation of Effect of Adhesive Application on
Physical Properties - (Cross-Machine Direction)

| Examples | Weight | Thickness | Strength | Stiffness |
|---|---|---|---|---|
| H3 w/o adh. | 1020 g/m² | 11.1 mm | 6.9 N | 1.9 N/mm |
| Fiberglass 2 | 1180 g/m² | 10.0 mm | 12.9 N | 4.2 N/mm |
| H4 w/adh. | 1115 g/m² | 9.3 mm | 23.6 N | 5.4 N/mm |
| H4 w/o adh. | 1055 g/m² | 10.3 mm | 14.0 N | 4.2 N/mm |

From the data above, it was found that the application of an adhesive to the composite material increased its strength and stiffness considerably. Although the examples provided above used an adhesive composition in powder form, other types of adhesives may instead be used, including adhesive films, emulsions, dispersions, and the like.

Because flame retardance is a desirable feature in composites used for office panels and other applications, it was necessary to evaluate the composite's performance, in terms of flame spread and smoke generation. As mentioned previously, to meet Class A flammability standards, a product must have a Flame Spread Index value of 25 or less and a Smoke Developed Index value of 450 or less. The composites were evaluated using ASTM E84-04, entitled "Standard Test Method for Surface Burning Characteristics of Building Materials" And the results as shown in Table 6.

TABLE 6

Evaluation of Flame Spread Index and Smoke Developed
Index for Various Composite Examples

| Example | % FR Fiber | Flame Spread Index | Smoke Developed Index |
|---|---|---|---|
| H1 | 0 | 30 | 450 |
| S5 | 10 | 0 | 25 |
| H6 - compressed to 9 mm | 10 | 0 | 45 |
| H6 - compressed to 6 mm | 10 | 0 | 20 |

For comparison, a sample (H1) that contained no flame retardant fibers was tested. It was theorized that a sample containing 100% polyester might perform well in this testing scenario, as the polyester would shrink away from the ignition source and become unavailable as a fuel source. However, during the 10-minute testing period, the polyester fibers in the fire end of the chamber became molten and dripped into a puddle on the chamber floor. As the heat in the chamber rose dramatically, the molten polymer on the chamber floor ignited and spread down the length of the chamber. Thus, this sample (H1) did not meet Class A standards for Flame Spread Index, because its score of 30 exceeds the maximum allowed value of 25. In addition, its Smoke Developed Index score of 450 was border-line passing for Class A, which requires a score of 450 or less.

Examples S5 and H6, which each contained 10% of the TREVIRA® CS fibers, were evaluated to determine whether the placement of the flame retardant fibers within the composite affected the performance of the composite. In Example S5, the flame retardant fibers were located primarily on one side of the stratified composite, having "migrated" to the side having the 15 denier bicomponent fibers. This side was placed downward in the test chamber (that is, nearest to the ignition source). In Example H6, the flame retardant fibers were blended with other fibers throughout the composite.

As shown by the test data, both Examples S5 and H6 met the standards for Flame Spread Index and for Smoke Developed Index. From this data, it was concluded that the placement of the flame retardant fibers did not impact the ability of the composite to meet the requirements for Class A flammability standards. For applications where strength and stiffness are less important than they are in office panel end uses, a stratified composite may be useful or even preferred.

A second version of Example H6, having the same fiber contents and weight as the first version of H6 but which had been compressed to a thickness of approximately 6 millimeters, was also evaluated to determine whether the thickness of the composite affected its performance. As shown by the test data, the thinner composite performed as well as the thicker composite, despite the closer placement (and expected greater entanglement) of the fibers within the composite. Hence, for applications where a thinner composite may be desirable, the present composite—using only a small amount of flame retardant fiber—is a functional option. This particular flame-retardant that is phosphorus based allows the polyester to melt, pull away from the flame, and most of the burning drips self-extinguish. Since the floor burn is used in calculating the flame spread, it important to either eliminate or prolong the material from burning on the floor. The addition of the FR fiber in the blend prolongs the combustion of the molten polyester on the floor of the tunnel. Without the FR, the floor will start to combust after 4 to 5 minutes into the test. With the FR, the molten polyester on the floor will combust after 7 to 8 minutes into the test.

Additional flammability testing has been completed with adhesive and a textile covering on the polyester product. This would represent how a furniture manufacturer would test the product to meet current building code standards. Historically, polyester products have not been able to pass Class A flammability with the adhesive and textile covering in combination with the polyester tile. In Table 7, samples P1-P5 each have 10% of the FR fibers but tested in different combinations.

The fiber blend for the polyester material being tested in samples P1-P5 is: 15d bico -63%, 13 dtex Trevira® CS—10%, 45 d post industrial regular—27%.

P1, P2, P4, & P5=polyester fabric face down, polyester adhesive, PET board, Metal Frame creating 2" gap, PET board, polyester adhesive, polyester fabric face up.

P3=polyester fabric stapled to PET board (fabric face down), Metal Frame creating a 2" gap, PET board with polyester fabric stapled to board (fabric face up) The adhesives were obtained from EMS-Griltech in Sumter, S.C.

TABLE 7

Various Panel System Examples

| Example | PET Weight g/m² | Adhesive Weight g/m² | Adhesive Type | Textile Weight oz/ln yd | Backcoating Type (if any) |
|---|---|---|---|---|---|
| P1 | 700 | 45 | EMS ® 1582 (No FR) | 11.5 | Acrylic |
| P2 | 700 | 45 | EMS ® 2008 (W/FR) | 11.5 | Acrylic |
| P3 | 850 | None | N/A | 11.5 | Acrylic |
| P4 | 750 | 25 | EMS ® 1582 (No FR) | 10 | None |
| P5 | 750 | 30 | EMS ® 1582 (No FR) | 12 | None |

TABLE 8

Evaluation of Flame Spread Index and Smoke Developed Index for Various Panel System Examples

| Example | Flame Spread Index | Smoke Developed Index | Comments |
| --- | --- | --- | --- |
| P1 | 15 | 479 | Fail for Smoke |
| P2 | 15 | 598 | Fail for Smoke (but higher smoke developed than P1) |
| P3 | 0 | 185 | Passes Class A Flammability |
| P4 | 20 | 381 | Passes Class A Flammability |
| P5 | 20 | 400 | Passes Class A Flammability |

Based on the testing results, using FR polyester adhesive in combination with a polyester textile covering and the polyester tile does not pass the E-84 test. The FR in the adhesive prohibits the polyester fabric and polyester composite from pulling away from the flame, thus the FR actually hurts flammability instead enabling materials to pass flammability tests. Since the material stays in the flame path longer, more material burns and thus more smoke is developed. Large amounts of polyester adhesive without FR will also lead to product failures. 20-30 g/m$^2$ of polyester adhesive has been found to be a preferred amount of adhesive to allow for proper adhesive of the polyester textile to the polyester composite and achieve a Class A flame rating. One advantage the polyester tile has over a fiberglass tile is less adhesive can be used to bond the textile covering to the surface of the polyester tile translating into a cost savings. Additionally, the FR in the bromine-based adhesive that is traditionally used in combination with fiberglass can be eliminated creating a more environmentally friendly panel system.

Example P1 shows that backcoatings which are not thermoplastic in nature, in combination with adhesive do not pass the E-84 test. The combination of polyester adhesive and backcoatings like acrylic, creates a wick effect for the textile and polyester composite so the material does not to pull away very easily from the flame. The acrylic/PET combination continues to burn on the textile during the test which does not allow the polyester to self extinguish on the floor of the tunnel. As the temperature increases in the tunnel, the burning material grows and spreads down the tunnel. The more the material burns, the more smoke is developed during the test. However, most textiles with backcoating but without adhesive in combination with the polyester composite generally pass this test. Without the adhesive there is less of the wicking effect which means the textile and tile are able to pull away from the flame.

Figure 4:
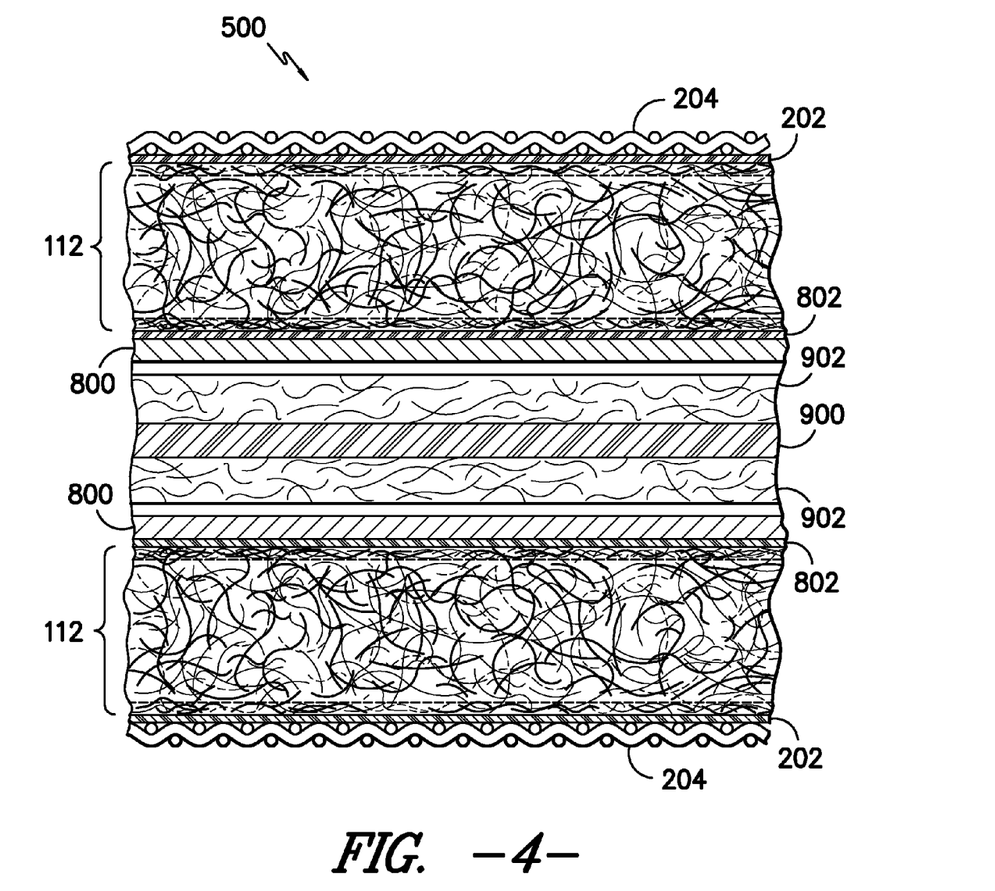
FIG. 4 is a cross-sectional view of a sound-absorbing septum for use with the office panel system of FIG. 3.

Turning back to the Figures, FIG. 4 illustrates yet another office panel system that includes the present composites. FIG. 4 is a schematic cross-sectional view of an office panel system, as may be used to provide superior acoustical properties. In such office panel system, a sound-transmitting membrane 900 is positioned between frames 800 of the front and rear of the office panel. Such sound-transmitting membrane 900 may be made of a wood product (such as compressed wood, particle board, medium density fiberboard, or the like), cardboard, metal (which is advantageous for flame retardance), or the like. The sound-transmitting membrane 900 may be used alone but is preferably used in conjunction with a fibrous flame-retardant batting 902, which serves as a sound-absorbing layer and as a flame retardant barrier for the sound-transmitting membrane 900. Such batting 902 is preferably wrapped around the sound-transmitting membrane 900 to provide additional flame retardance to the overall office panel system and is especially useful when such membrane 900 is itself flammable. An air gap may remain between the fibrous batting 902 and the frame 800 to provide insulative properties.

The fibrous batting layer 902 may be made of any of a number of suitable materials including, without limitation, 100% PANOX® (an oxidized, thermally stabilized polyacrylonitrile) fibers available from SGL Group—The Carbon Company of Meitengen, Germany; flame retardant rayon; flame retardant rayon blends; carbon; fiberglass; other fibers that may be treated with a flame retardant agent; and fabrics, especially non-wovens, treated with a flame retardant agent. One particularly preferred material for fibrous batting layer 902 is a needle-punched non-woven substrate made of 100% PANOX® oxidized polyacrylonitrile fibers and having a weight of approximately 5 ounces per square yard. Alternately, the fibrous batting layer 902 may be made of an 80/20 blend of flame retardant rayon and bicomponent polyester, in which the polyester fibers act as a binder, and which has a weight of about 2 ounces per square foot.

Ultimately, the choice of material for fibrous batting layer 902 depends upon the material used for the sound-transmitting membrane 900. For instance, if the sound-transmitting membrane 900 is made of metal (or some other fire resistant material), then the fibrous batting layer 902 may be optional for imparting flame retardant properties, but preferable for sound absorption reasons. If the sound-transmitting membrane 900 is flammable, then a flame retardant fibrous batting layer 902 is advantageous to minimize flame spread and to prevent the inner membrane from becoming a fuel source. In some circumstances, a 100% polyester product (such as the loosely consolidated web described herein) may be suitable as the fibrous batting layer 902.

Flammability testing was conducted on office panel systems containing one of two different fibrous batting layers 902. The first fibrous batting layer (identified as Batting 1 and abbreviated B1) was a 100% PANOX® (an oxidized, thermally stabilized polyacrylonitrile) fibers available from SGL Group—The Carbon Company, which had a weight of about 5 ounces per square yard. The second fibrous batting layer (identified as Batting 2 and abbreviated B2) was a thermally bonded non-woven made of 80% flame retardant rayon and 20% bicomponent polyester, which had a weight of about 2 ounces per square foot.

As shown in FIG. 4, the configuration of the office panel systems included a ⅛$^{th}$ inch thick piece of compressed eucalyptus wood, which acted as a sound-transmitting membrane and which was wrapped (that is, completely surrounded) by one of the fibrous batting layers described above as B1 and B2. This subassembly was positioned within a metal frame, after which a single layer of the H6 composite was inserted on each side of the subassembly. There was an air gap between the H6 composite and the fibrous batting layer B1 or B2. These office panel configurations were then tested for ten minutes, according to ASTM E84-04 procedures, the results of which are provided below in Table 7.

TABLE 9

Flammability Testing of Fibrous Batting Layers in Office Panel Configuration

| Example | Flame Spread Index | Smoke Developed Index |
| --- | --- | --- |
| Composite panels: H6 Septum: Wood wrapped with B1 fibrous layer | 20 | 250 |

TABLE 9-continued

Flammability Testing of Fibrous Batting
Layers in Office Panel Configuration

| Example | Flame Spread Index | Smoke Developed Index |
|---|---|---|
| Composite panels: H6 Septum: Wood wrapped with B2 fibrous layer | 25 | 250 |

Both office panel systems containing fibrous batting layers B1 and B2 passed the requirements for Class A Flammability, in that the Flame Spread Index score was 25 or less and the Smoke Developed Index score was less than 450. These results indicate that it is possible to have an outer composite layer that burns through and an inner flame retardant barrier that will prolong the time required for the flames to reach the sound-transmitting membrane. Such a finding represents a significant paradigm shift in thinking about creating fire resistant office panel systems, which in the past relied upon a flame retardant barrier on the outside of the office panel (made of fiberglass) to prevent flame spread, thus allowing for the use of a flammable sound-absorbing or -transmitting core (because the flames would theoretically be prevented from reaching the core).

Another way of achieving improved acoustic performance is to add a perforated film layer to the back of the polyester board. Because decreasing sound transmission and increasing sound absorption are important in an office panel, perforating holes in the film have proved to be able to achieve the desired results. Below is a table with acoustic testing conducted at Riverbanks Acoustical Lab in Geneva, Ill.:

TABLE 10

Acoustic Performance of polyester material with
and without film in an office panel configuration

| Sample Tested | Weight of Board (g/m2) | Thickness of Board (ln) | Adhesive Type & Amt (g/m2) | Fabric Weight (oz/ln yd) | NRC | STC |
|---|---|---|---|---|---|---|
| A1 without film | 700 | .154"; | PET 25 g/m2 | 11.5 | .55 | 6 |
| A2 with solid film | 610 | .154" | PET 25 g/m2 | 11.5 | .25 | 17 |
| A3 with film with 22 ppsi | 610 | .154" | PET 25 g/m2 | 11.5 | .5 | 16 |
| A4 with film with 44 ppsi | 610 | .154" | PET 25 g/m2 | 11.5 | .55 | 14 |

A1-4 have the same blend of fibers: 30% of 15 bicomponent fiber, 30% of 4 denier bicomponent fiber, 25% 15 d PET post industrial fiber, 5% 45 d PET fiber, and 10% of the 13dtex FR fiber. The above samples were all tested in the same configuration: 4 skins in total (~30"×60") consisting of the fabric laminated to the PET board secured in a sub frame were mounted 2 on each side of a main steel frame. There was an air gap between the panels that was roughly 2".

Although the disclosure herein has focused largely on the production of office panel systems and requirements for such systems, it should be understood that other end uses of the present composites are possible. Among such end uses are privacy screens, in which the composite material may be molded to a free-standing configuration and in which sound-deadening or -absorbing acoustic properties may be desirable. In such privacy screens, which may be useful for health care environments, the yarns or the loosely consolidated non-woven web may be treated with antimicrobial treatments and/or stain or soil release treatments to impart additional desirable properties to the finished composite.

The present composite may also be made in the form of a portable wall, which may extend from the floor to the ceiling and may be attached at the floor, the ceiling, or both. Such portable walls are repositionable and provide flexibility in arranging interior spaces. One concept is to take a heavy weight version of the invention and increase the thickness to 0.5". This concept would be applicable if the goal was to replace an incumbent product like mineral board. The advantage of using polyester in this application is very similar to the ones listed above in the office panel market. This polyester product would need to be supported in metal frame with metal cross supports due to the large size of the walls i.e. 4'×8'. Another concept is to create an acoustical moveable wall system. Use a polyester panel of appropriate weight to meet the stiffness requirements and laminate fabric to it. A lofted version of the polyester material behind the rigid panel would complete the composite. All materials would be held in a frame and would likely require metal cross supports.

Also, because the present composite is made of thermoplastic materials, it is moldable, making it suitable for use in any number of applications, including as door facings for cabinets; as automotive headliners, trunk liners, or door panels; as reinforcements; and other various applications.

As mentioned previously, a film layer may be applied to the present composite material for some end uses. In one such end use, a polyester film may be applied to an all-polyester composite to create an erasable "white board" that is both lightweight and recyclable.

It is also very likely that a robust version of this polyester composite described above but with increased weight and polyester film laminated to one side could possibly replace the sub-steel in an office panel configuration.

Replacing the sub-steel would may result in an overall cost reduction in an office panel system. This composite would be attached directly to the main frame in lieu of being contained inside a sub-steel frame which is attached to the main frame.

The smooth nature of this product may enable the elimination of surface treatments being applied directly to the product for decoration. Typically, the panels are covered with a textile. With the proper surface preparation of the board to allow inks to stay in place, the board could be printed. Other options include applying colored or printed films, using transfer print paper/film, or scattering colored polyester adhesive powders.

These and many other end uses in which strength, stiffness, flame retardance, and/or recyclability are desirable demonstrate the need for such a composite material.

What is claimed is:

1. A non-woven composite comprising:
   (i) a plurality of strength-imparting fibers, the strength-imparting fibers being present in an amount of between about 20% and about 40% of the weight of the non-woven composite;
   (ii) a plurality of binder fibers, the binder fibers having a low-melt component and being present in an amount of between about 50% and about 70% of the weight of the non-woven composite; and
   (iii) a plurality of flame retardant fibers, the flame retardant fibers being present in an amount of between about 5% and about 20% of the weight of the non-woven composite, wherein at least a portion of the strength-imparting fibers have a denier that is at least twice the denier of the binder fibers, wherein the flame retardant fibers comprise a topical flame retardant treatment;
   wherein the strength-imparting fibers, binder fibers, and flame retardant fibers form a single homogeneous layer, and wherein the low-melt component of the binder fibers forms a skin on both sides of the non-woven composite, and wherein the strength-imparting fibers, binder fibers, flame retardant fibers, and textile layer are comprised of the same thermoplastic material.

2. The non-woven composite of claim 1, wherein the strength-imparting fibers, binder fibers, and flame retardant fibers all comprise polyester.

3. The non-woven composite of claim 1, further comprising an adhesive layer on at least one surface of the non-woven composite.

4. The non-woven composite of claim 1, further comprising a textile layer adhered to at least one side of the non-woven composite.

5. The non-woven composite of claim 1, further comprising printing on at least one side of the composite.

6. The non-woven composite of claim 1, further comprising a film on at least one side of the composite.

7. The non-woven composite of claim 1, wherein the low-melt component comprises at least 20% of the weight of the non-woven composite.

8. The non-woven composite of claim 1, wherein the composite has a flame spread index score of 25 or less and a smoke developed index score of 450 or less when tested according to ASTM E84-04.

9. A modular panel comprising:
   a metal frame;
   a non-woven composite in the metal frame, wherein the non-woven composite comprises:
   (i) a plurality of strength-imparting fibers, the strength-imparting fibers being present in an amount of between about 20% and about 40% of the weight of the non-woven composite;
   (ii) a plurality of binder fibers, the binder fibers having a low-melt component and being present in an amount of between about 50% and about 70% of the weight of the non-woven composite; and
   (iii) a plurality of flame retardant fibers, the flame retardant fibers being present in an amount of between about 5% and about 20% of the weight of the non-woven composite, wherein at least a portion of the strength-imparting fibers have a denier that is at least twice the denier of the binder fibers, wherein the flame retardant fibers comprise a topical flame retardant treatment, wherein the strength-imparting fibers, binder fibers, and flame retardant fibers form a single homogeneous layer, and wherein the low-melt component of the binder fibers forms a skin on both sides of the non-woven composite; and,
   (iv) a layer bonded to at least one side of the non-woven composite;
   wherein the strength-imparting fibers, binder fibers, flame retardant fibers, and textile layer are comprised of the same thermoplastic material.

10. The modular panel of claim 9, wherein the layer bonded to at least one side of the non-woven composite comprises a film or textile.

11. The modular panel of claim 10, wherein the layer is a textile and is selected from the group consisting of woven fabric, non-woven fabric, and knit fabric.

12. The modular panel of claim 9, wherein the flame retardant fibers comprise a topical flame retardant treatment.

13. The modular panel of claim 9, wherein the flame retardant fibers comprise a non-halogenated flame retardant additive incorporated into the molecular backbone of the polymer forming the flame retardant fibers.

14. The modular panel of claim 9, wherein the strength-imparting fibers, binder fibers, and flame retardant fibers all comprise polyester.

15. The modular panel of claim 9, wherein the non-woven composite has a flame spread index score of 25 or less and a smoke developed index score of 450 or less when tested according to ASTM E84-04.

16. A modular panel comprising:
    a metal frame;
    a non-woven composite in the metal frame, wherein the non-woven composite comprises:
    (i) a plurality of strength-imparting fibers, the strength-imparting fibers being present in an amount of between about 20% and about 40% of the weight of the non-woven composite;
    (ii) a plurality of binder fibers, the binder fibers having a low-melt component and being present in an amount of between about 50% and about 70% of the weight of the non-woven composite; and
    (iii) a plurality of flame retardant fibers, the flame retardant fibers being present in an amount of between about 5% and about 20% of the weight of the non-woven composite, wherein at least a portion of the strength-imparting fibers have a denier that is at least twice the denier of the binder fibers, wherein the flame retardant fibers comprise a topical flame retardant treatment, wherein the strength-imparting fibers, binder fibers, and flame retardant fibers form a single homogeneous layer, and wherein the low-melt component of the binder fibers forms a skin on both sides of the non-woven composite, wherein the strength-imparting fibers, binder fibers, flame retardant fibers, and textile layer are comprised of the same thermoplastic material.

17. The modular panel of claim 16, further comprising an adhesive powder on at least one side of the composite.

18. The non-woven composite of claim 16, further comprising printing on at least one side of the composite.

19. The non-woven composite of claim 16, further comprising a film on at least one side of the composite.

20. The non-woven composite of claim 16, wherein the strength-imparting fibers, binder fibers, and flame retardant fibers all comprise polyester.

* * * * *